J. H. SHARP.
CONCAVES FOR THRASHING-MACHINES.
No. 189,507. Patented April 10, 1877.
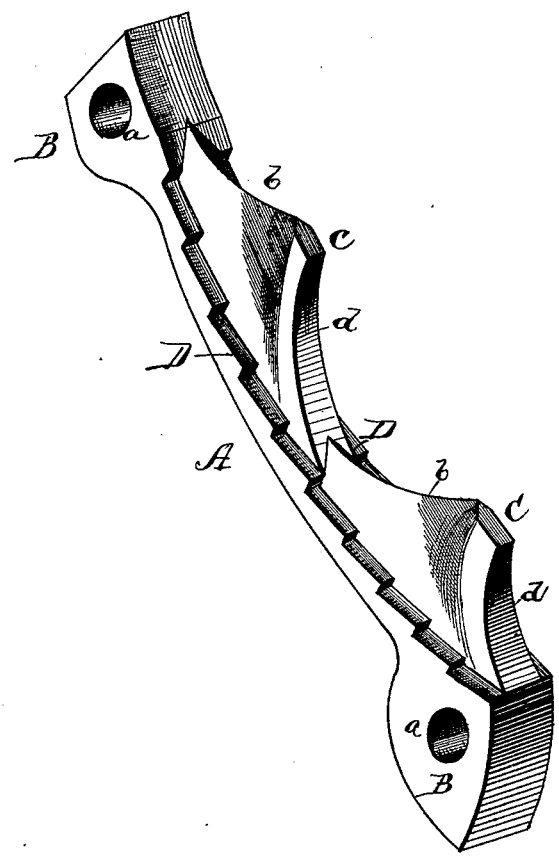

UNITED STATES PATENT OFFICE.

JOHN H. SHARP, OF DOYLESTOWN, PENNSYLVANIA.

IMPROVEMENT IN CONCAVES FOR THRASHING-MACHINES.

Specification forming part of Letters Patent No. 189,507, dated April 10, 1877; application filed February 17, 1877.

*To all whom it may concern:*

Be it known that I, JOHN H. SHARP, of Doylestown, in the county of Bucks and State of Pennsylvania, have invented certain new and useful Improvements in Concaves for Thrashing-Machines; and I do hereby declare that the following is a full, clear, and exact description thereof, reference being had to the accompanying drawings, and to the letters of reference marked thereon, which form part of this specification.

My invention relates to thrashing-machines; and it consists in the construction and arrangement of the sections for forming the concave under the thrashing-cylinder, as will be hereinafter more fully set forth.

In order to enable others skilled in the art to which my invention appertains to make and use the same, I will now proceed to describe its construction and operation, referring to the annexed drawing, which represents a perspective view of one of the sections of the thrashing-machine concave.

I construct the concave for a thrashing-machine of a series of sections, A, each section being cast in one piece, with a head, B, at each end, having a suitable hole, $a$, for the passage of the bolts for connecting the sections together.

Each section A is composed of a curved bar, with two large V-shaped teeth, C C, projecting from the concave. The upper edges $b$ of these teeth (which teeth are arranged in line, one behind another) are sharp, while the lower edges $d$ are broad, as shown, and the base of the teeth is narrower than the width of the section, leaving a narrow ledge on each side of the teeth C the entire length of the section.

On these ledges are formed a number of smaller teeth, D D, which prevent loose heads from passing through without being thrashed.

The entire section A, with its perforated heads B and large and small teeth D, are all cast in one piece.

Having thus fully described my invention, what I claim as new, and desire to secure by Letters Patent, is—

In a concave for thrashing-machines made in sections, the section A, provided with the perforated heads B B, projecting teeth C C, formed with sharp front edges $b$, and arranged in line, as shown, and the series of side teeth D on both sides of the teeth C, along the edges of the section substantially as and for the purposes herein set forth.

In testimony that I claim the foregoing as my own I affix my signature in presence of two witnesses.

JOHN H. SHARP.

Witnesses:
JOHN K. TOMLINSON,
JAMES GILKYSON.